United States Patent [19]

Weston

[11] 4,079,743

[45] Mar. 21, 1978

[54] AIR BLEEDING DEVICE

[75] Inventor: William Augustus Weston, Kilcreggan, Scotland

[73] Assignee: Bridgemore Engineering Limited, Paisley, Scotland

[21] Appl. No.: 740,488

[22] Filed: Nov. 10, 1976

[30] Foreign Application Priority Data

Nov. 13, 1975 United Kingdom ............... 46846/75

[51] Int. Cl.[2] ............................................ F16K 31/20

[52] U.S. Cl. .................................... 137/174; 137/202; 137/192; 137/446

[58] Field of Search ............... 137/174, 202, 192, 558, 137/446

[56] References Cited

U.S. PATENT DOCUMENTS

| | | | |
|---|---|---|---|
| 428,399 | 5/1890 | Moore | 137/174 |
| 2,252,687 | 8/1941 | Bassett | 137/174 X |
| 2,504,638 | 4/1950 | Browning | 137/446 X |
| 3,251,374 | 5/1966 | Smith | 137/174 |
| 3,823,732 | 7/1974 | Elsby | 137/446 |
| 3,888,274 | 6/1975 | Weston | 137/174 |

*Primary Examiner*—Alan Cohan
*Attorney, Agent, or Firm*—Gerald J. Ferguson, Jr.; Joseph J. Baker

[57] ABSTRACT

An automatically operating air bleeding device for a liquid supply system, especially a fuel supply system for a diesel engine, comprises a tank having a fuel inlet, an upper air outlet valve, a lower fuel outlet valve, a pivotally mounted float and a pivotally mounted follower member resting on the float for effecting opening of the air outlet valve if the fuel in the tank falls to a first predetermined level due to the entry of air into the tank, and for closing the fuel outlet valve if the fuel falls to a second and lower predetermined level, and a magnet on the follower for actuating a switch for a warning device prior to the fuel lowering to said second level.

13 Claims, 2 Drawing Figures

AIR BLEEDING DEVICE

This invention relates to an air bleeding device for use in a pressurised liquid supply system, especially but not exclusively the fuel supply system of a fuel injection engine.

According to the present invention there is provided an air bleeding device for use in a pressurised liquid supply system, especially but not exclusively the fuel supply system of a fuel injection engine, said device comprising a closed tank having a liquid inlet opening adapted for connection to a liquid inlet pipe, an upper air bleed valve, and a lower liquid outlet valve each comprising a valve opening and a valve member movable to open and close the valve opening, a pivotable float controlling movement of both said valve members, and a follower lever member which is pivotally mounted on the tank and bears on an upper portion of the float, the arrangement being such that, in use, if the liquid in the tank falls below a first predetermined level due to the entry of air into the tank, the air bleed valve opens due to downward movement of the float and of the follower member, and, if the liquid falls below a second and lower predetermined level, the float, under the weight of the follower member, effects closure of the liquid outlet valve to prevent further lowering of the liquid level and the passage of air through the liquid outlet valve opening.

Figure 1:
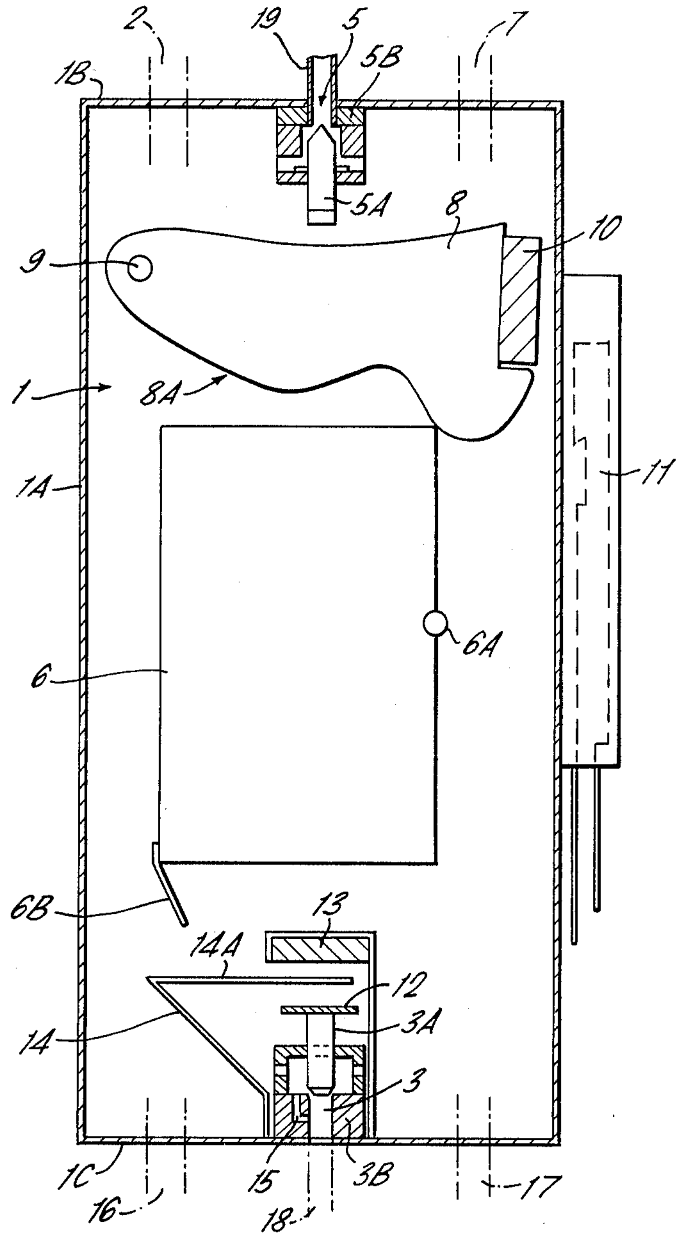
Figure 2:
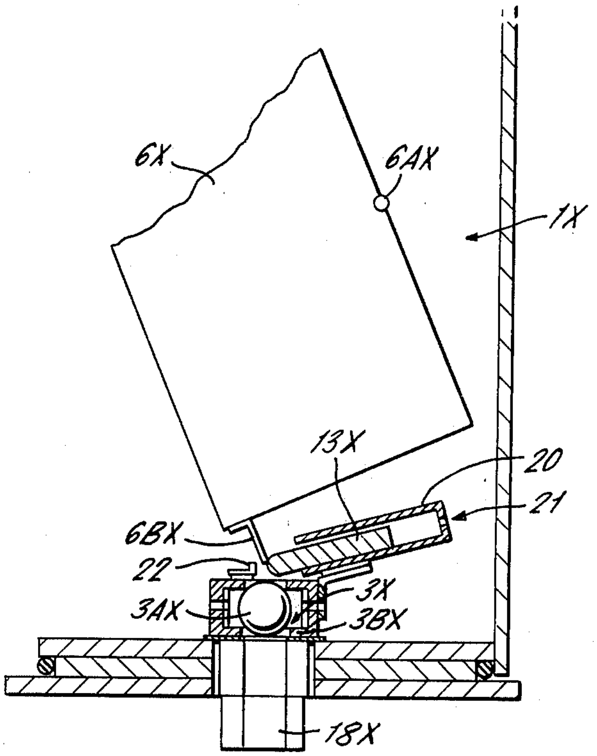

An embodiment of the invention will now be described, by way of example, with reference to a fuel supply system for a diesel engine in a vehicle, and with reference to the accompanying diagrammatic drawings, in which:

FIG. 1 shows an air bleeding device according to the present invention, in cross section, and FIG. 2 is a fragmentary view corresponding to FIG. 1 and showing a modification.

Referring to FIG. 1, an air bleeding device for the fuel supply system of a diesel engined vehicle comprises a closed cylindrical tank 1, into which fuel is fed through an inlet opening 2 by a feed or lift pump, not shown, and from which the fuel passes to a fuel injection pump, not shown, through a fuel outlet valve having a valve outlet opening 3, a movable valve member 3A and a valve seat 3B. The tank has a peripheral wall 1A and is closed by top and bottom walls 1B, 1C, and the fuel outlet valve is mounted on the bottom wall 1C.

The tank 1 has mounted on its top wall 1B an automatically operating air bleed valve having an air outlet valve opening 5, a movable member 5A and a valve seat 5B. A manually operable air bleed valve or cock 7 is also mounted on the top wall 1B.

Within the tank 1, there is provided a float 6 which is pivotal about a transverse axis 6A. At its lower end, the float 6 has a downwardly projecting finger 6B. Between the float 6 and the air bleed valve, there is a follower member 8 which is pivotal about a transverse axis 9. The follower member 8 has a cammed bottom face 8A resting on the float 6, and at its free end carries a magnet 10 or other device for actuating, as will be later described, a reed switch 11 carried on the outside of the casing 1, and connected to a warning device, not shown.

The movable valve member 3A carries a magnet 12, and a fixed magnet 13 is provided above the magnet 12, and a resiliently flexible member 14 has a flange 14A extending between the magnets 12, 13. A small port 15 in the seat 3B by-passing the valve member 3A may be provided, and, on the bottom wall 1C of the tank, a drainage plug 16, a manual bleed valve 17, and a fuel outlet pipe 18 are provided. On the top wall 1B of the tank, a pipe 19 connected to the air bleed valve opening 5 leads to atmosphere or to an excess fuel pipe to return to the main fuel feed.

Operation of the air bleed device will now be described.

When sufficient fuel enters the tank 1 by way of the fuel inlet 2, the float 6 rises, and, as the tank 1 fills with fuel, the displaced air escapes past the air bleed valve member 5A, which has dropped off its seat 5B, through the valve opening 5.

As the float 6 rises, the follower member 8 pivots upwards under the action of the float 6 and continues to rise until such times as the top of the follower member 8 meets with the lower part of the air valve member 5A and raises it to its seat 5B and so closes the valve.

Fuel continues to enter the tank until such times as the tank is pressurised to the pressure available from the lift pump.

If air enters the tank with the fuel, it becomes trapped at the top of the tank where it collects until there is a large enough quantity to lower the fuel level and so pivot the float 6 downwards about the axis 6A, and consequently lower the follower member 8 about its axis 9 and eventually allow the valve member 5A, which has an extended shaft to give it extra weight, to drop from its seat 5B and allow the air to escape through the passage 5.

Fuel entering the container at 2 automatically replaces the air expelled and raises the float 6 and the follower member 8 to close the valve member 5A, and so on.

Assuming that more air than the automatic bleeding device can cope with enters the tank, (this would only normally happen if the engine consumed all of the fuel in the main fuel tank) then the float 6 falls to such an extent that the magnet 10 on the follower 8 drops to a position where it activates the reed switch 11 which, in turn activates the warning device.

Assuming the vehicle engine continues to be run consuming more fuel, then the float 6 lowers still further until such time as the protrusion or finger 6B on the float 6 comes into contact with the flange 14A of the member 14, and flexes it downwards. This depresses the magnet 12, breaking it away from the attraction of the magnet 13, and so moves the valve member 3A on to its seat 3B and shuts off the supply of fuel to the engine, which normally leaves the tank by way of the pipe 18.

When fuel is replaced in the main tank and again raised to the tank 1 by the lift pump or by the hand activator of the lift pump, it is only necessary to raise the level in the container sufficiently to allow the float 6 to rise sufficiently to allow the valve member 3A to rise off its seat 3B by the action of the magnets 12 and 13 to allow the engine to be re-started. However, it would be more normal to allow the lift pump to fill the tank to such an extent that the warning device became inactive, before starting the engine.

At present, when a diesel engine requires to be bled, a very great strain is placed on the battery, and in particular on the starter motor, because of the very extended time the engine has to be turned to clear the fuel system of air. The present automatic bleeding system reduces this to an absolute minimum and in most cases could extend the life of the starter motor very considerably.

The small port 15, if provided, joining the tank 1 to the fuel outlet pipe 18 exists in order to release the valve member 3A from its seat 3B should this be necessary but the passage 15 is not large enough to allow sufficient fuel to pass to keep the engine running even at its slowest speed.

The manual bleed valve 17 enables any water that may have collected within the tank to be bled off without stopping the engine or draining the tank 1. The upper manual air bleed valve 7 may be used to remove the last quantities of air above the height of the automatic air bleed valve at initial installation and at any other time that it may be thought desirable to do so.

The follower member 8 because of the shape of its cammed surface 8A, adds additional weight to the float 6 where this is required, i.e., when the float 6 is displacing the slide member 14, 14A, and when the tank is being refilled. The surface 8A is arranged to extend the period between the warning device being switched-on and the fuel outlet valve being shut off, so that a greater 'reserve' than would be possible by use of the float alone is available.

It is also possible to "adjust" the reserve quantity simply by altering the profile and weight of the follower member 8, so making it very simple to manufacture bleeding devices for vehicles with different fuel consumption rates. Thus, by a simple change of member, the same unit can be made to give 1 mile reserve at say 20 mpg or 1 mile reserve with a vehicle which may consume fuel at the rate of 12 mpg.

There may be baffles as required fitted within the tank 1, below the fuel inlet and also around the fuel outlet, and anywhere else within the tank that it may be thought desirable.

Various modifications may be made without departing from the scope of the invention. For example, the port 15 may be replaced by a groove in the movable valve member 3A or in the valve seat 3B, and the magnet 12 may be dispensed with, if the movable valve member 3A is made of magnetisable metal. Also, the port 15 may alternatively be fed by a drip feed device.

Referring to FIG. 2, in which parts corresponding to parts in FIG. 1 are indicated by the same reference numbers with the suffix X, the fuel outlet valve is a ball valve comprising an outlet opening 3X, a ball 3AX, and a valve seat 3BX. The ball 3AX is normally held in its raised, valve-open position by a magnet 13X. The latter, which may be rod-shaped, is slidable in an inclined slideway 20 between a lowered position, in which it lies close enough to the ball 3AX to attract it magnetically to its raised, valve-open position, and a raised position in which it moves further into the slideway 20 and it no longer attracts the ball, so that the latter drops and closes the valve. The magnet 13X is raised to its valve-closing position by the finger 6BX on the float 6X, as the latter swings downwards about its axis 6AX when the fuel level is such that the valve is to be closed. When the tank 1X is being refilled, and the float 6X swings back towards its initial position, the finger 6BX, which is made of magnetisable material and remains magnetically attracted to the magnet 13X, draws the latter back down to its initial position in which the ball is magnetically attracted back to its valve-open position. Inclination of the magnet and its slideway facilitates downwards movement of the magnet, enables the magnet to move closer to the ball than might otherwise be possible, and militates against accidental upward displacement of the magnet.

A stop 22 prevents the magnet from being removed, or falling out of the slideway, and also defines the lowermost position of the magnet in which opening of the valve is effected. One or more fuel relief holes 21 are provided at the upper end of the slideway 20.

The valve member 5A in FIG. 1 may also be replaced by a ball, and the extended shaft on the member 5A may be replaced by a magnet fixed to the follower member 8, to attract the ball from its seat when the follower member 8 lowers.

From the above, it will be seen that the device described can save a great deal of time and money which would otherwise be lost by breakdowns caused by diesel engines, especially in commercial vehicles, drawing air into their fuel systems due to slack or faulty couplings, bad gaskets, or cracked pipes, because the air bleeding device described will normally automatically remove air which otherwise would be pumped along the fuel line and into the injector pump and cause the engine to stop, and, in the event of the fuel supply to the tank 1 being cut off, the fuel outlet valve in the tank 1 closes and prevents the tank 1 emptying and air from being sucked into the injector pump.

The air bleeding device is not limited to use with a diesel engine or diesel engined vehicle, but can be used, for example, with a fuel injection petrol engine or in any other liquid supply system.

It is to be understood that the float is made of non-magnetisable material, such for example as brass or plastics material.

The follower member 8, as shown, in FIG. 1 may be said to be of generally shoe shape, the pivot 9 being at the toe end. In a modification, not shown, the follower member is turned through 180° about a vertical axis, and the pivot 9 passes through the heel end, so that the toe end is the free end and carries the magnet 10.

In a further modification, not shown, the lower face of the follower member 8 is not cammed, but is straight. In this case, it is unnecessary to provide follower members of different shapes for different reserve quantities of fuel, as explained above, to allow for different rates of fuel consumption by an engine. All that is necessary is to adjust the position of the pivot 9 relative to the follower 8 and/or the position of the pivot 9 relative to the tank 9. The follower 8 may therefore be provided with a plurality of holes, any one of which can be selected for the pivot pin to give the required fuel reserve. Alternatively, the follower may have a plurality of pivot pins, or a pivot pin or pins which is or are eccentrically adjustable.

As a further alternative, a plurality of supports for a pivot pin may be provided on the tank.

From the above, it will be clear that, in addition to determining the reserve amount of fuel, the co-action between the follower and the float can be so arranged that, at required times during the rise or fall of the liquid in the float, there is a differential or relative movement between the follower and the float. This enables the air outlet valve to remain closed until the float has lowered by a predetermined amount, so as to avoid the possibility of rapid opening and closing of the valve, or so called hunting of the valve, which could happen if the valve opened after an otherwise negligible lowering of the liquid level. It also enables the follower to remain for a time substantially stationary or to lower more slowly relative to the lowering of the float, once the magnet 10 has activated the switch 11, so that, during further lowering of the float, the magnet 10 does not swing sufficiently far from the switch as to deactivate it, or at least until the fuel outlet valve is closed.

The weight of the follower member may be varied so as to vary, in effect, the buoyancy of the float.

I claim:

1. An air bleeding device for use in a liquid supply system, especially but not exclusively the fuel supply system of a fuel injection engine, said device comprising a closed tank having a liquid inlet opening for connection to a liquid inlet pipe, an upper air bleed valve, and a lower liquid outlet valve, each said valve comprising a valve opening and a valve member movable to open and close the valve opening, a float controlling movement of both said valve members, and a follower lever member which is pivotably mounted at one end on the tank and bears adjacent its free end on an upper portion of the float; in which there is provided intermediate upper and lower ends of the float a pivot member which extends transversely of the tank and pivotally anchors the float therein; and the free end portion of said follower lever member bears freely and slideably on the upper end of the float to permit a differential movement therebetween upon pivotting of the float; and in which, in use, if the liquid in the tank falls below a first predetermined level due to the entry of air into the tank, the air bleed valve opens due to downward movement of the float and of the follower member, and, if the liquid falls below a second and lower predetermined level, the float, under the weight of the follower member, effects closure of the liquid outlet valve to prevent further lowering of the liquid level and the passage of air through the liquid outlet valve opening.

2. A device as claimed in claim 1, in which the tank carries a magnetically actuable switch adapted for connection to a warning device, and the follower member carries a magnet for actuating said switch at a predetermined liquid level above said second level.

3. A device as claimed in claim 2, in which said predetermined liquid level lies between said first and second levels.

4. A device as claimed in claim 1, in which the lower face of the follower member which engages an upper portion of the float is cammed.

5. A device as claimed in claim 2, in which the lower face of the follower member which engages an upper portion of the float is so cammed that the magnet on the follower member actuates the switch at a level predetermined in accordance with the rate at which the liquid is to be consumed.

6. A device as claimed in claim 1, in which the movable member of the outlet valve is held in its open position by a magnet.

7. A device as claimed in claim 6, in which means for effecting closure of the outlet valve comprises a resiliently flexible member having a flange projecting above the movable member of the valve, and a finger projecting downwardly from the float, so that when the liquid in the tank falls to said second level, said finger flexes said flange downwards, and the flange pushes the movable valve member to its closed position.

8. A device as claimed in claim 6, in which said magnet holds the movable member of the valve in a raised open position, and is movable by the float to a position in which said member is no longer attracted to the magnet and falls to close the outlet valve.

9. A device as claimed in claim 8, in which said magnet is slidably mounted on a slideway which is downwardly inclined towards the outlet valve, so as to facilitate movement of the magnet towards its position in which it holds the valve open.

10. A device as claimed in claim 9, in which the float is provided with a downwardly projecting finger for engaging and moving said magnet, said finger being made of magnetisable material.

11. A device as claimed in claim 1, in which the tank is provided at its upper end with a manually operable air bleed valve.

12. A device as claimed in claim 1, in which the lower face of the follower member which engages an upper portion of the float is straight, and the pivot of the follower relative to the follower and to the tank is so located that the magnet on the follower member actuates the switch at a liquid level predetermined in accordance with the rate at which the liquid is to be consumed.

13. A device as claimed in claim 1, in which the tank is provided with a pipe bye-passing the fuel outlet valve and placing the tank in communication with a feed pipe leading externally from the liquid outlet valve, said bye-pass pipe being connected to a drip-feed device, so that liquid can drip into said feed pipe when the liquid outlet valve is closed.

* * * * *